UNITED STATES PATENT OFFICE.

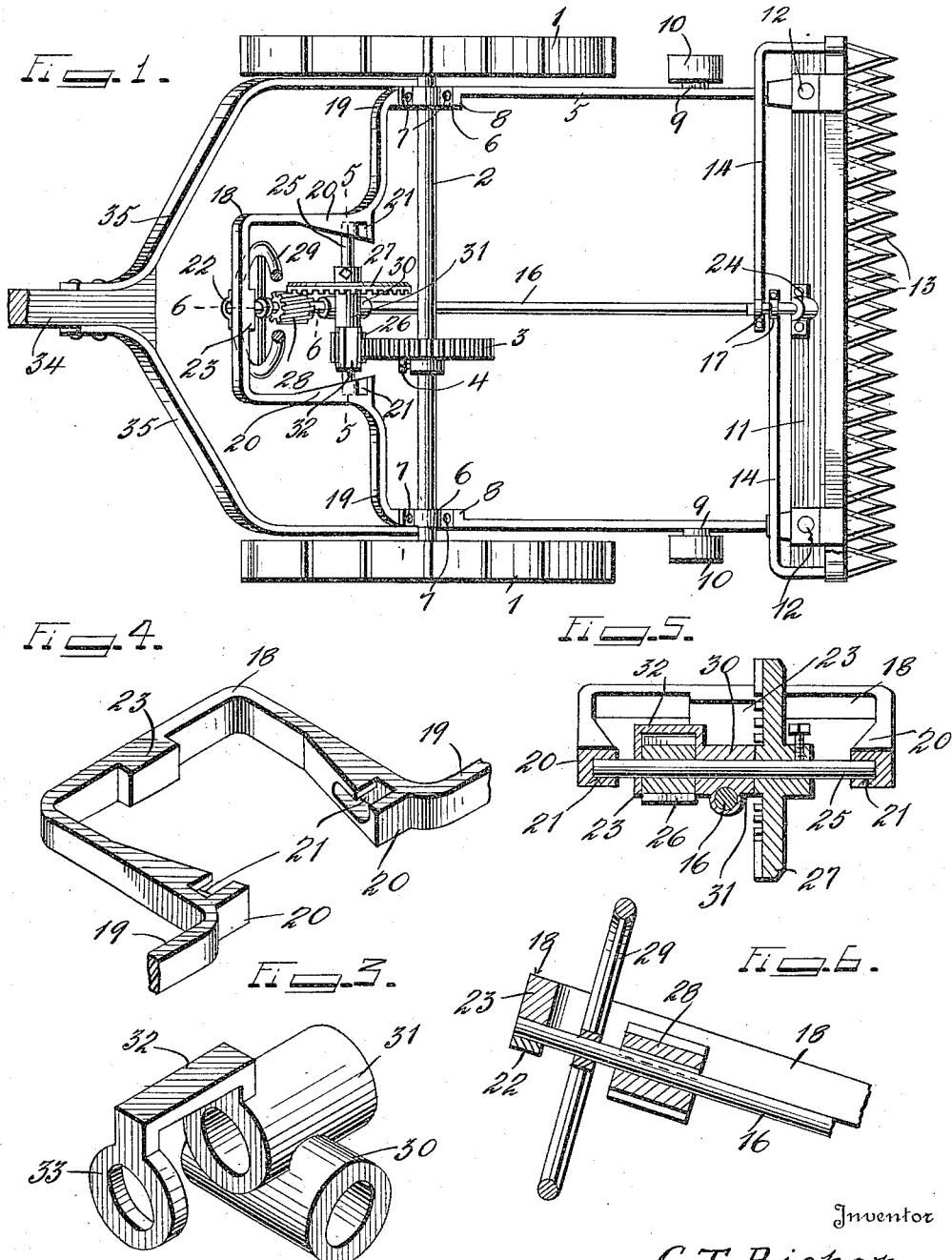

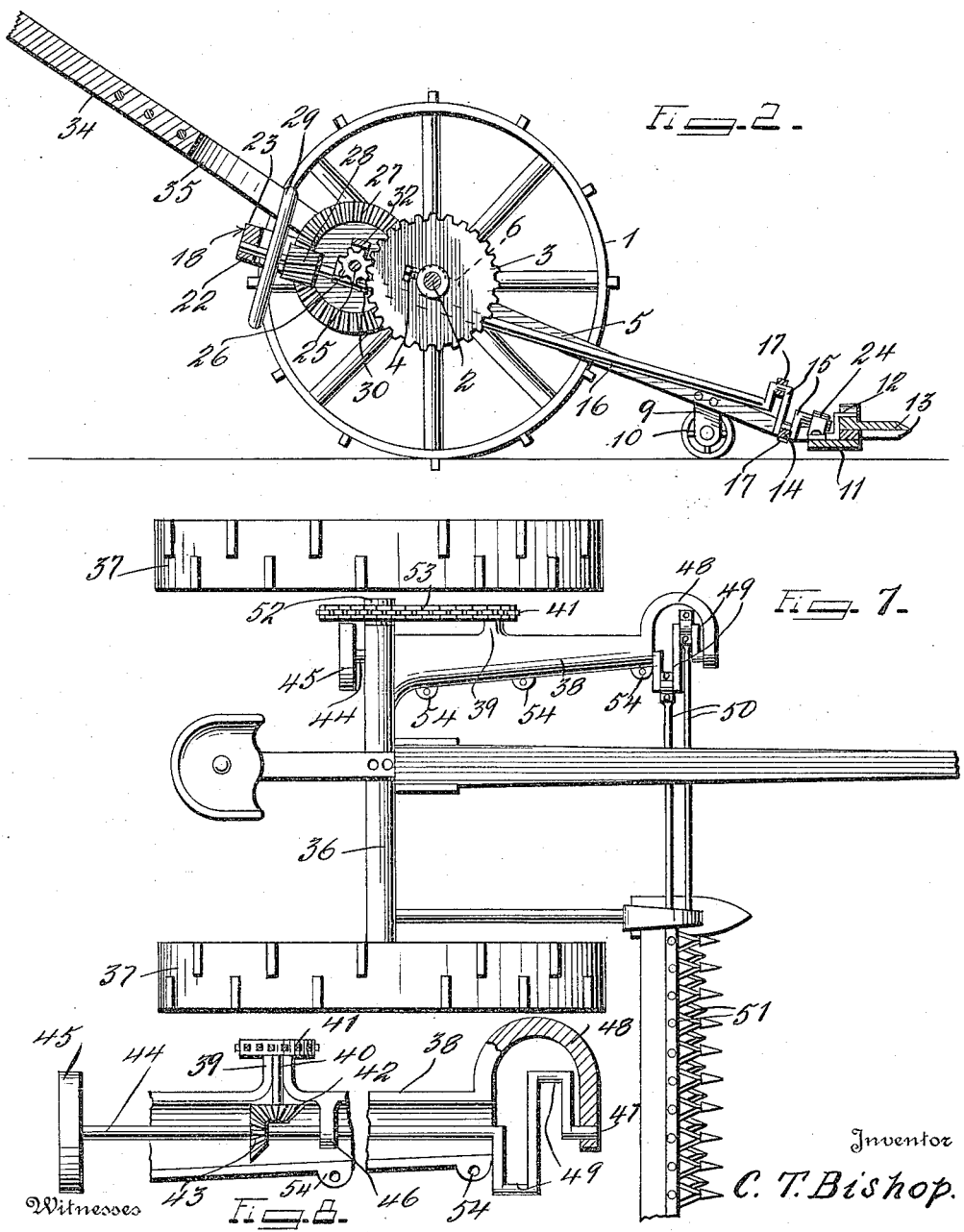

CHARLES T. BISHOP, OF FAYETTEVILLE, TENNESSEE.

LAWN-MOWER.

1,170,505.   Specification of Letters Patent.   Patented Feb. 8, 1916.

Application filed March 29, 1915. Serial No. 17,807.

*To all whom it may concern:*

Be it known that I, CHARLES T. BISHOP, a citizen of the United States of America, residing at Fayetteville, in the county of Lincoln and State of Tennessee, have invented certain new and useful Improvements in Lawn-Mowers, of which the following is a specification, reference being had therein to the accompanying drawing.

This invention relates to a lawn mower and has for its principal object the production of an efficient operating mechanism whereby the cutting blades may be easily reciprocated when the device is in operation.

Another object of this invention is the production of an efficient mechanism for a lawn mower wherein a certain hanger journal is provided for the purpose of supporting the operating elements in their correct relations.

Another object of this invention is the production of a yoke member, forming part of the frame of the lawn mower, this yoke member being so constructed as to efficiently and positively support the operating mechanism for the device, after the same has been assembled.

With these and other objects in view, this invention consists of certain novel combinations, constructions, and arrangements of parts as will be hereinafter fully described and claimed.

In the accompanying drawings: Figure 1 is a top plan view of the lawn mower as constructed in accordance with this invention. Fig. 2 is a central longitudinal section taken through the device. Fig. 3 is a detailed perspective view of the hanger journal. Fig. 4 is a detailed perspective view, partially in section, of the yoke. Fig. 5 is a section taken on the line 5—5 of Fig. 1. Fig. 6 is a section taken on the line 6—6 of Fig. 1. Fig. 7 is a slightly modified form of the invention, illustrating the manner in which the device is used in connection with a mower. Fig. 8 is a fragmentary sectional view through the housing used in connection with this modified form.

Referring to the accompanying drawings by numerals it will be seen that there are provided the bearing or supporting wheels 1 which carry the main axle 2 upon which the drive gear 3 is keyed by means of the set screw 4. This axle 2 is adapted to carry the side arms 5 of the frame of the lawn mower by means of the clamps 6 which fit over the axle 2 and are secured by the rivets or other securing means 7 to the thickened portion 8 of the parallel side arms 5. These arms 5 are provided with blocks 9 to which the supporting casters 10 are rotatably secured. A supporting strip 11 is carried by the lower end of these arms 5 by any suitable means, as disclosed in general at 12. This strip 11 is adapted to carry the reciprocal cutter blades 13 whereby the cutter blades 13 will first come into engagement with the grass for mowing the same, as the mower is pushed through the grass. The connecting links 14 are secured to the end portions of the cutting blades 13 and are also connected to the crank portions 15 of the drive shaft 16 as shown at 17. It will be seen that as this drive shaft 16 is rotated, the crank portion 15 thereof will cause the links 14 to be actuated so as to reciprocate the cutter blades 13 and as these cutter blades are reciprocated, they will efficiently mow the grass which comes into engagement therewith.

A U-shaped yoke 18 is provided with the laterally extending portions 19 and these laterally extending portions 19 are integral with the thickened portion 8 of the parallel side arms 5. This yoke 18 is provided with the integral blocks 20 formed upon the inner portions thereof adjacent the laterally extending portions 19. Each block 20 is provided with a bayonet slot 21 for purposes to be hereinafter set forth. The drive shaft 16 has its upper end carried by the clamp 22 secured to the thickened portion 23 of the yoke 18. In this manner it will be seen that the shaft 16 will be efficiently supported at its upper end by the yoke and at its lower end by the clamp 24 mounted upon the strip 11. A stub shaft 25 is positioned so as to allow its end portions to fit within the bayonet slots 21 of the blocks 20 formed upon the yoke 18. This stub shaft 25 has a small gear 26 keyed thereto so as to mesh with the drive gear 3 keyed upon the axle 2. Therefore, when the axle 2 is rotated, rotary motion will be imparted to the small gear 26 by means of the drive gear 3. A second enlarged gear 27 is keyed upon the stub shaft 25 so as to mesh with the spiral gear 28 keyed to the drive shaft 16. It is of course obvious that a fly wheel 29 may be carried upon the shaft 16 so as to facilitate the operation of the device after the same has been started.

For the purpose of assisting in retaining the several portions of the operating mechanism in their correct relations there is provided a journal hanger, as disclosed very clearly in Fig. 3. This journal hanger has a hollow sleeve 30 formed integral upon the hollow sleeve 31 and extending at right angles thereto. The hollow sleeve 31 however has a bridge portion 32 formed integral thereon and being provided with a depending integral collar 33 formed in alinement with one end of the sleeve 31 and in parallel spaced relation thereto. The hanger journal is adapted to be positioned so as to allow the drive shaft 16 to extend through the hollow sleeve 30. Since the sleeve 31 extends at right angles to the sleeve 30, the stub shaft 25 may be positioned so as to extend through the sleeve 31 and the hollow collar 33. Since the collar 33 is formed at a spaced distance from one end of the sleeve 31, sufficient space is provided for the accommodation of the small gear 26. Thus the small gear 26 will be held against longitudinal movement upon the stub shaft 25 while the passing of the drive shaft 16 through the sleeve 30 will assist in resisting any tendency of the hanger journal creeping along the stub shaft 25. Furthermore, since this hanger journal is carried by the stub shaft it will assist in supporting the drive shaft adjacent its upper end and thereby firmly retaining the spiral gear 28 in engagement with the secondary enlarged gear 27. Therefore, while the hanger journal is so formed as to engage both the drive shaft 16 and the stub shaft 25, it will not in the least effect the operation of the several operating elements.

It should be noted that when the device is assembled the stub shaft will first be positioned so as to allow its end portions to be passed into the bayonet slots 21. The gear 3 of the axle 2 may then be keyed in its correct position upon the axle so as to engage the small gear 26. The meshing of these gears will firmly bind the stub shaft 25 in its correct position and will therefore prevent the stub shaft from accidental displacement or otherwise being accidentally removed from the bayonet slots. It is of course obvious that a handle 34 may be provided having the connecting strips 35 secured thereto and also attached to the frame of the lawn mower in any suitable manner for the purpose of facilitating the moving thereof when so desired.

From the foregoing description it will be seen that a very efficient lawn mower has been produced wherein the drive gears are so keyed as to facilitate the reciprocal movement of the cutter blades and which are so carried as to positively remain in their correct operative positions and engagements, which is accomplished by the use of the hanger journal and yoke.

By referring to Figs. 7 and 8, it will be seen that a mower has been produced wherein the axle casing 36 is carried by the supporting wheels 37. This axle casing 36 is adapted to carry the housing 38 extending at right angles thereto. This housing 38 has the neck 39 extending from one side portion thereof and from this neck 39 the stub axle 40 extends so as to carry the sprocket 41. The opposite end of this stub axle 40 is provided with the beveled gear 42 which engages the beveled gear 43 of the drive shaft 44 having the fly wheel 45 at its upper end. This drive shaft 44 is held in its correct position within the housing 38 by means of the integral lugs 46 through which the shaft extends. The lower end of this shaft is journaled as shown at 47 in the looped or hooked end 48 of the housing 38. The crank portions 49 are formed upon the shaft 44 adjacent its lower end and to these crank portions 49 the pitmen 50 of the cutter blades 5 are secured. Therefore, as the shaft 44 is rotated, reciprocating action will be imparted to the cutter blades 51 by means of the pitmen 50 secured to the cranks 49. The sprocket 52 is keyed to the axle of the mower so that when the axle is rotated this sprocket will rotate and impart rotary motion to the sprocket 41 by means of the chain 53 connecting these two sprockets. It is of course obvious that the housing may be formed in two sections and secured together by means of any suitable securing members which may be passed through the gears 54.

From the foregoing description it will be seen that an efficient operating mechanism is provided for a lawn mower which is more simple in construction than are the structures now in general use and since the operating portions comprise a minimum number of parts, the device is not as likely to become inoperative or injured when in operation as are the more complicated structures.

What I claim is:—

1. In a lawn mower of the class described the combination of a frame, said frame having reciprocating cutter blades at its forward portions an axle carried by said frame and provided with supporting wheels, a U-shaped yoke formed integral upon said frame, a drive shaft extending through and being secured to said yoke and also to the forward portions of said frame, means connected to said drive shaft and said cutter blades for reciprocating said cutter blades as said drive shaft is actuated, a drive gear keyed to said axle, a stub shaft carried by said yoke and extending at right angles to said drive shaft, a plurality of gears keyed upon said stub shaft, a spiral gear keyed upon said drive shaft and engaging one of the gears of said stub shaft, said drive gear of said axle engaging the remaining gear of said stub shaft whereby when said axle is rotated, rotary motion may be imparted to said drive shaft for actuating said cutter blades, a hanger journal carried upon said stub shaft, said hanger journal comprising a sleeve fitting upon said stub shaft, a second sleeve formed upon said first-mentioned sleeve and being secured to said drive shaft, said sleeves extending at right angles to each other, a bridge formed integral upon said first-mentioned sleeve and terminating in a depending hollow collar, said bridge being adapted to fit over one of the gears of said stub shaft so as to allow said collar to embrace said stub shaft whereby the gears upon said stub shaft will be held in their correct relations and the drive shaft will be supported so as to positively retain the gear thereof in engagement with one of the gears of said stub shaft.

2. In a lawn mower of the class described, the combination of a frame, said frame provided with reciprocal cutter blades at its forward portion, a yoke formed integral upon said frame, said yoke provided with integral blocks, each of said blocks provided with a bayonet slot, an axle carried by said frame and provided with supporting wheels, a stub axle carried by said yoke so as to allow the ends thereof to fit within said bayonet slots, said stub axle provided with a plurality of gears, a drive gear keyed upon said first-mentioned axle and engaging one of the gears of said stub axle, whereby said stub axle will be positively retained within said bayonet slots, a drive shaft carried by said frame and said yoke, means connecting said drive shaft and said cutter blades for reciprocating the same, a gear carried by said drive shaft, and engaging one of the gears of said stub axle, whereby, upon the rotation of said first-mentioned axle, rotary motion will be imparted to said drive shaft for actuating said cutter blades.

In testimony whereof I hereunto affix my signature.

CHAS. T. BISHOP.

Copies of this patent may be obtained for five cents each, by addressing the "Commissioner of Patents, Washington, D. C."